United States Patent Office 3,401,664
Patented Sept. 17, 1968

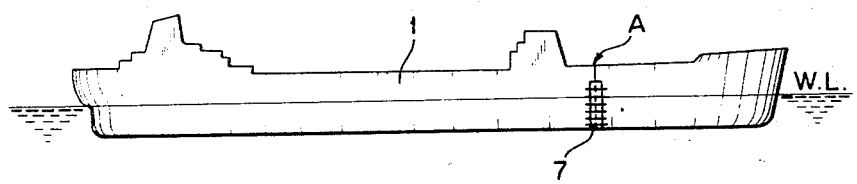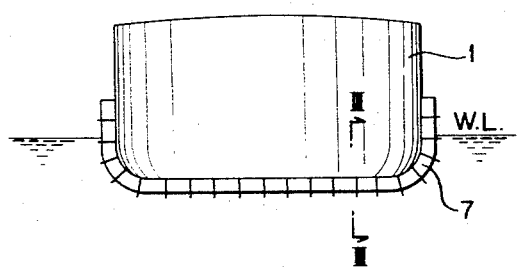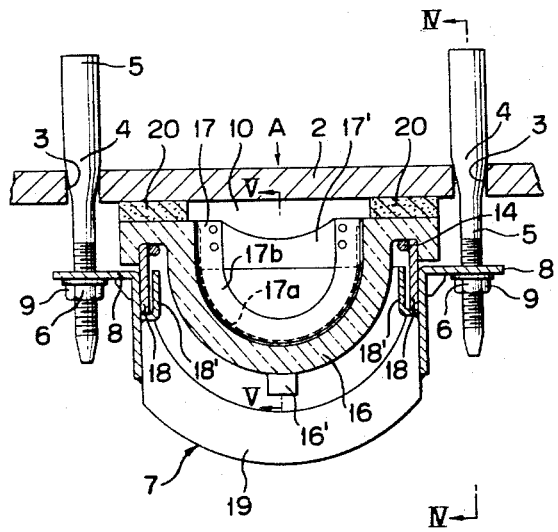

3,401,664
APPARATUS FOR FIXING A WATERPROOF BAND FOR USE IN THE CUTTING OR THE JOINING OF A STRUCTURE FLOATING ON THE WATER
Shinichi Furukawa, Kazuyoshi Yamada, and Ichizo Takizawa, Tokohama-shi, Japan, assignors to Mitsubishi Jukogyo Kabushiki Kaisha, Tokyo, Japan
Filed Jan. 11, 1967, Ser. No. 608,578
Claims priority, application Japan, June 27, 1966, 41/41,683 (utility model), 41/60,697
9 Claims. (Cl. 114—77)

ABSTRACT OF THE DISCLOSURE

An apparatus to be attached to a floating hull structure below its water level for use in separating the hull or in rejoining the hull. The apparatus comprising a waterproof band assembly having a U-shaped configuration with its opening directed toward the hull. Reinforcing means within the assembly for supporting its walls against exterior pressure when water is evacuated from its interior. Attachment members extending through the hull for securing the member onto the hull whereby it can be forced into watertight engagement with the hull to prevent any passage of water into the interior of the waterproof band assembly.

A method for preparing a floating hull structure to be cut or welded together whereby openings are provided in the hull, inserting a securing means through the openings in the hull, attaching a structure in sealed relationship to the hull, removing water from the structure sealed to the hull and subsequently performing the operation of cutting or rejoining the hull as required.

---

The present invention relates to a method and an apparatus for fixing a waterproof band for use in the cutting or in the joining of divided parts of a structure floating on the water.

Usually, in constructing or rebuilding a structure floating on the water, such as a ship, the cutting of the hull or the joining of divided hull parts has hitherto been performed on a building berth or in a dock. Recently constructed ships have rapidly increased in size because of both great profit as well as progress in shipbuilding technique. Thereby, it has also been required to rebuild the hull of a ship so as to make it much larger. Most of the existing dock installations, however, have not a capacity for the rebuilding of a super ship. Accordingly, in order to meet the increasing necessity to make the hull much larger, either the erection of a new dock installation or the enlarging of an existing one is needed. In any case, the cost of dock installation unfavorably becomes high. It is thus proposed, in constructing a huge ship or rebuilding a ship to make it much larger, that the hull of a ship is divided in the floating condition and that the divided hull parts are joined together in the floating condition. In these cases, a waterproof band is used for watertightly covering the dividing or the joining portion of the hull. In order to fix, tightly, the waterproof band to the outside of the hull, it has already been proposed to perform, outside the hull, welding by which bolts are joined therewith or to use magnets or a special bonding agent such as synthetic resin. In these performances, a hull-cutting line has to be marked in the water and, further, the waterproof band has to be fixed in the water. The operations are very complicated and difficult and, therefore, can be neither reliable nor safe. Unfavorably, the construction cost thus becomes high.

Accordingly, it is a primary object of the present invention to provide a method of fixing a waterproof band to the underwater outside of a cutting or a joining portion of a structure afloat, such as the hull of a ship, which is very simple and reliable and which overcomes the disadvantages hereinabove referred to.

Another object of the present invention is to provide an apparatus for surely watertightly fixing a waterproof band to the underwater outside of a cutting or a joining portion of a structure afloat such as the hull of a ship.

In accordance with the present invention, which relates to method and apparatus for fixing a waterproof band to the underwater part of a dividing or a joining portion of the shell plate of the hull of a ship, a structure floating in the water, in order to divide the structure afloat into a proper number of parts or to join together the divided parts afloat of the structure, the dividing or the joining portion is watertightly covered with a waterproof band so that water may be discharged from the inside of the waterproof band. Furthermore, holes are bored in the underwater part of the shell plate, the waterproof band being secured to fixing members which are fitted in the holes inside the structure and which are protruding from the shell plate.

Other objects and features of the present invention will be, by way of example, described with reference to the accompanying drawings, wherein:

FIG. 1 is a side view of the hull of a ship to which the present invention is applied;

FIG. 2 is a cross-sectional view of the hull shown in FIG. 1;

FIG. 3 is a sectional view taken along the line III—III of FIGS. 2 and 5;

Figure 4:
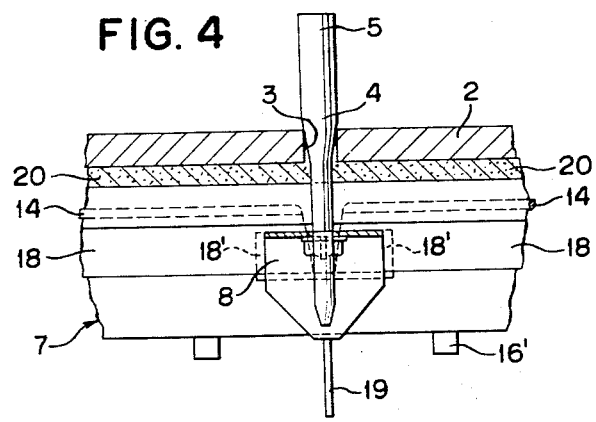
FIG. 4 is a sectional view taken along the line IV—IV of FIG. 3.

In the first embodiment of the invention illustrated in FIGS. 1 to 5, holes 3 are bored near the cutting portion A properly provided in the shell plate 2 of the hull of a ship. Fixing members 5 provided with tapered parts 4 respectively are inserted into holes 3 inside the hull and are secured. Because the diameter at the inner end of the hole 3 is somewhat smaller than that of the tapered part 4, each fixing member 5 can be fitted in the hole by striking said member inside the hull. Thereby, the fixing member can watertightly be protruded out of the hull.

Figure 5:
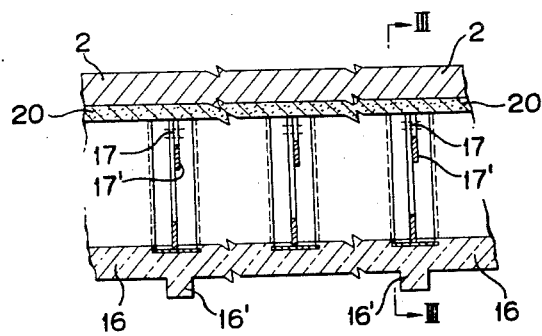
FIG. 5 is a sectional view taken along the line V—V of FIG. 3.

A waterproof device assembly 7 is provided with a waterproof band 16, whose cross-section is U-shaped, made of elastic material such as rubber or synthetic resin. In order to keep the form of the member 16, a plurality of steel framing 17 are provided, at a proper pitch, inside the band 16, as shown in FIG. 5. The steel framing 17, whose cross-section is T-shaped, consists of a flange 17a and a web 17b and is bent to be U-shaped, as shown in FIG. 3. The flange part 17a is tightly fitted in each U-shaped groove provided on the inside of the band 16, while the web parts 17b are, at end thereof, reinforced by being connected with each other by supporting members 17'. Thumb member 16' are provided, at a proper distance from each other, on the outside surface of the waterproof band 16 for divers, who can easily handle the band 16 with thumb members during the underwater operation. Flat iron plates 18 provided with keep pieces 14 are fitted on both side edges of the band 16 and further are inserted between support pieces 8 and receiving pieces 18', respectively. The support piece 8 on which the receiving piece 18' is provided is engaged with the fixing member 5 to be tightened by means of a nut 9. Thereby, a watertight holding part 20 of the band 16 is pressed enough to keep watertight. A connecting piece 19 is provided between the support pieces 8.

The watertight elastic member 20 is a seal member made of, for instance, a foaming synthetic resin and is adequately provided between the shell plate 2 of the hull and the waterproof band 16.

The waterproof device assembly 7 thus assembled can watertightly cover the underwater part of the dividing or the joining portion of the shell plate of the hull by engaging the support piece 8 of the waterproof device assembly 7 with the engaging part 6 provided at the end of the fixing member 5 and by screwing the engaging member 9 on said part 6.

After the discharge of water from a space 10 of the waterproof device assembly 7 thus kept watertight, the cutting or the joining operation at the portion A is performed.

Figure 6:
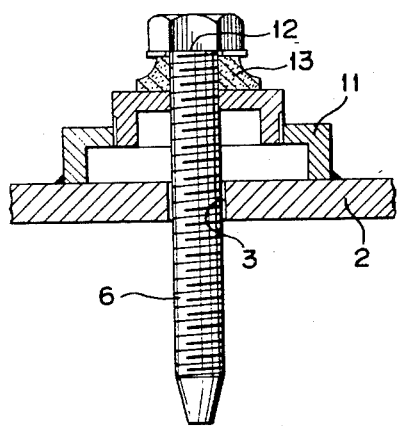
FIG. 6 is a sectional view of a fixing member showing a modified embodiment of the invention.

In the second embodiment illustrated in FIG. 6, an attachment 11 is provided near the predetermined cutting portion of the shell plate 2 of the hull 1, as in the case of the first embodiment, a hole 3 being bored in said shell plate. A fixing member 12 is screwed into a threaded hole of the attachment 11 to the extent that the free end of the fixing member 12 can protrude at the hole 3 beyond the shell plate 2.

In this case, in order to keep the attachment watertight, a watertight element 13 for instance a rubber element may be provided. A waterproof device assembly 7 similar to that described in the first embodiment is secured to the protruding member 12.

As is evident from the foregoing, the waterproof-band fixing member 5 or 12 can easily be mounted at a correct position on the underwear part of the shell plate of the structure. Furthermore, the waterproof device assembly 7 can easily be secured to said fixing member by screwing. Accordingly the underwater part of the cutting or the joining portion of the structure can simply and reliably be covered, said covered part being used as watertight space for the operation.

In the first embodiment already described, the fixing member 5 is provided with the tapered part 4 with which said member 5 is watertightly fixed to the shell plate by striking or by press fitting. If, however, the tapered part 4 is formed by providing a watertight elastic member such as a rubber body on the fixing member, then the same effect can be obtained.

As described above, in order to divide a structure afloat such as a ship into a proper number of parts or to join together the divided parts afloat of the structure, the underwater part of the dividing or the joining portion of the shell plate of the hull of the structure is watertightly covered with a waterproof band so that water may be discharged from the inside of the waterproof band. Furthermore, according to the present invention, holes are bored in the underwater part of the shell plate and moreover the waterproof band is secured to fixing members, which are fitted in the holes inside the structure and which are protruding from the shell plate. Thereby an underwater marking operation for the cutting of the hull can be evaded, though the operation previously was difficult but necessary for welding waterproof band fixing bolts to the shell plate of the hull or for causing said bolts to adhere thereto by the use of magnets or adhesives. According to the invention, the marking operation can be done from inside the hull. Accordingly, the operation can be reliable and simple. Further, since the waterproof band is secured to fixing members which are protruding from the shell plate of the hull, the fixing of the waterproof band can be performed reliably and easily. Consequently, the present invention is a very useful one for the industry.

It is to be understood that the present invention should not be limited to the above-mentioned embodiments and that various modifications may be made without departing from the spirit and scope of the invention.

What is claimed is:
1. Apparatus adapted to be attached to a floating hull structure having a water level thereon and comprising an assembly adapted to be disposed on the exterior of a hull and extending below the water level thereon and comprising a longitudinally extending waterproof wall member, said wall member having a pair of spaced side members extending along its longitudinal edges and a web section extending between said side members, said side members adapted to be positioned closely spaced from the hull and said web adapted to extend outwardly from said side members away from the hull forming a chamber therebetween, reinforcing means for said wall member positioned on the surface of said wall member arranged to face toward the hull for withstanding exterior pressure applied to the opposite surface thereof, means disposed on said side members of said wall member and adapted to contact said hull for forming a waterproof seal therewith, a plurality of members adapted to be removably secured within and in watertight engagement with openings in the hull, and means for securing said assembly to said members for forcing said means disposed on said side members into watertight engagement with said hull.

2. An apparatus, as set forth in claim 1, wherein said waterproof wall member has a U-shape cross section with the opening therein adapted to be direced toward the exterior of the floating hull structure.

3. An apparatus, as set forth in claim 2, wherein said reinforcing means comprises transversely arranged interior support members positioned within and at spaced intervals along the web of said U-shaped wall member for providing reinforcement against exterior pressure.

4. An apparatus, as set forth in claim 3, wherein said support members for said wall member are T-shaped in cross section with the head of the T fitted into a groove in the web of said wall member and the web portion of the T extending from the web of said wall member.

5. An apparatus, as set forth in claim 2, wherein attachment members are fixed to the outer surface exterior of said U-shaped wall member and have openings therethrough to fit on said members adapted to be secured to said hull, and wall sections for securing said attachment members to said wall member.

6. An apparatus as set forth in claim 5, wherein tab members are positioned on the outer surface of said wall member to afford a surface for holding said assembly while it is being positioned on the hull.

7. An apparatus, as set forth in claim 2, wherein the side members of said wall member comprise a pair of outwardly arranged longitudinally extending flanges at the opening of said U-shaped member, a sealing member extending along each of said flanges, and said sealing members comprising an elastic material for providing a waterproof seal between said assembly and the hull.

8. An apparatus, as set forth in claim 5, wherein said members adapted to extend through said hull have an enlarged section arranged to be located within said hull, a tapered section for watertight engagement with the hull and a narrower threaded section arranged to extend exteriorly of the hull and to receive the attachment members of said assembly.

9. An apparatus, as set forth in claim 8, wherein threaded nut members are positioned on the threaded portions of said members adapted to extend through said hull for forcing said assembly into watertight engagement with said hull.

References Cited

UNITED STATES PATENTS

| 1,550,144 | 8/1925 | Blumberg | 114—229 |
| 2,007,972 | 7/1935 | Miller | 114—227 |

MILTON BUCHLER, *Primary Examiner.*

TRYGVE M. BLIX, *Assistant Examiner.*